US012741619B2

(12) United States Patent
Gummesson

(10) Patent No.: US 12,741,619 B2
(45) Date of Patent: Sep. 22, 2026

(54) WORKING MACHINE WITH A FRAME STRUCTURE CONTROLLED EMERGENCY STOP ACTUATOR

(71) Applicant: VOLVO CONSTRUCTION EQUIPMENT AB, Eskilstuna (SE)

(72) Inventor: Martin Gummesson, Rottne (SE)

(73) Assignee: VOLVO CONSTRUCTION EQUIPMENT AB, Eskilstuna (SE)

(*) Notice: Subject to any disclaimer, the term of this patent is extended or adjusted under 35 U.S.C. 154(b) by 419 days.

(21) Appl. No.: 18/477,133

(22) Filed: Sep. 28, 2023

(65) Prior Publication Data

US 2024/0120156 A1 Apr. 11, 2024

(30) Foreign Application Priority Data

Oct. 6, 2022 (EP) .................................... 22200028

(51) Int. Cl.
*B60T 7/22* (2006.01)
*B60R 21/00* (2006.01)
(Continued)

(52) U.S. Cl.
CPC ............ *B60T 7/22* (2013.01); *B60R 21/0136* (2013.01); *H01H 3/022* (2013.01); *B60R 2021/0081* (2013.01)

(58) Field of Classification Search
CPC ................... B60T 7/22; B60R 21/0136; B60R 2021/0076; B60R 2021/0081;
(Continued)

(56) References Cited

U.S. PATENT DOCUMENTS 3,664,701 A 5/1972 Kondur
3,901,346 A * 8/1975 Kohls .................. B60R 19/483 180/277

(Continued)

FOREIGN PATENT DOCUMENTS

CN 211468411 U * 9/2020
CN 114750716 A 7/2022
GB 2029536 A 3/1980

OTHER PUBLICATIONS

Machine translation of CN 211468411 U, CN, Chen et al., published Sep. 11, 2020, translation obtained Dec. 31, 2025. (Year: 2025).*

(Continued)

*Primary Examiner* — Laura Freedman
(74) *Attorney, Agent, or Firm* — Sage Patent Group

(57) ABSTRACT

The present disclosure relates to a working machine, comprising an electric traction motor configured to apply a torque on at least one wheel of the working machine during propulsion, an electric power system electrically connected to the electric traction motor; the electric power system being configured, during propulsion, to supply electric power to the electric traction motor, an emergency stop actuator arranged on an exterior surface of the working machine, the emergency stop actuator being electrically connected to the electric power system, wherein the electric power system is configured to cut off the electric power supply to the electric traction motor upon actuation of the emergency stop actuator, and a frame structure connected to the working machine, the frame structure comprising an abutment surface, wherein the frame structure is operatively arranged to move from a first position in which the abutment surface is arranged at a distance from the emergency stop actuator, to a second position in which the abutment surface (Continued)

is in abutment with the emergency stop actuator to thereby actuate the emergency stop actuator.

12 Claims, 3 Drawing Sheets

(51) Int. Cl.
*B60R 21/0136* (2006.01)
*H01H 3/02* (2006.01)

(58) Field of Classification Search
CPC .......... B60K 28/14; B60P 1/04; B60L 3/0007; B60L 3/02; B60L 2200/40; H01H 3/022
See application file for complete search history.

(56) References Cited

U.S. PATENT DOCUMENTS 4,243,127 A * 1/1981 Lee ........................ B60T 15/041
192/221
4,397,372 A * 8/1983 De Kraker ............ B60R 19/483
180/277
4,674,590 A * 6/1987 Krieg ........................ B60T 7/22
180/275
5,148,886 A * 9/1992 Parsons .................. B60K 28/14
180/275
5,775,750 A * 7/1998 Gauci ................... B60R 19/483
180/274
6,739,635 B2 * 5/2004 Byun ...................... B60R 19/28
293/135
11,938,891 B2 * 3/2024 Zheng ..................... B60R 21/36
2006/0113122 A1 * 6/2006 Persson ................. E01C 19/262
180/19.1
2018/0160672 A1 6/2018 Crinklaw et al.
2020/0029490 A1 1/2020 Bertucci et al.

OTHER PUBLICATIONS

Extended European Search Report, European Patent Application No. 22200028.3, mailed Apr. 12, 2023, 6 pages.

* cited by examiner

WORKING MACHINE WITH A FRAME STRUCTURE CONTROLLED EMERGENCY STOP ACTUATOR

CROSS REFERENCE TO RELATED APPLICATIONS

This application claims priority to European Patent Application No. 22200028.3 filed on Oct. 6, 2022, the disclosure and content of which is incorporated by reference herein in its entirety.

TECHNICAL FIELD

The present disclosure relates to a working machine. In particular, the present disclosure relates to a working machine comprising an emergency stop actuator which is actuated when being arranged in abutment with a movable frame structure of the working machine. Although the present disclosure will mainly be directed to an autonomously controlled working machine in the form of an autonomously controlled dump truck, the disclosed subject matter may also be applicable for other types of working machines, preferably autonomously controlled working machines.

BACKGROUND

In connection with transportation of heavy loads at construction sites or the like, a working machine is often used. The working machines may be utilized for transportations in connection with road or tunnel building, sand pits, mines, forestry, and similar environments, and are often provided in the form of an articulated hauler or a rigid hauler.

Autonomously controlled working machines are currently being developed. The autonomously controlled working machines conventionally operates at a confined area delivering material from one position to another. During operation of such autonomously controlled working machine, the safety system needs to function in a safe manner such that e.g., the working machine stops when there is a hazardous situation in the vicinity of the working machine.

However, since the autonomously controlled working machine lacks an operator, there is a need to further improve the safety when, e.g., sensors, etc. fail to detect a hazardous operating condition. Accordingly, a backup safety system is needed for these types of vehicles.

SUMMARY

It is thus an object of the present disclosure to at least partially overcome the above-described deficiencies.

According to a first aspect, there is provided a working machine, comprising an electric traction motor configured to apply a torque on at least one wheel of the working machine during propulsion, an electric power system electrically connected to the electric traction motor; the electric power system being configured to, during propulsion, supply electric power to the electric traction motor, an emergency stop actuator arranged on an exterior surface of the working machine, the emergency stop actuator being electrically connected to the electric power system, wherein the electric power system is configured to cut off the electric power supply to the electric traction motor upon actuation of the emergency stop actuator, and a frame structure connected to the working machine, the frame structure comprising an abutment surface, wherein the frame structure is operatively arranged to move from a first position in which the abutment surface is arranged at a distance from the emergency stop actuator, to a second position in which the abutment surface is in abutment with the emergency stop actuator to thereby actuate the emergency stop actuator.

The wording "cut off the electric power" should be construed such that, when the actuator is actuated, the electric traction motor no longer receives electric power for its propulsion and is thereby not able to propel the working machine in the forward and rearward driving directions. The electric power system comprises processing circuitry connected to an electronic switch or equivalent, when the actuator is actuated, the processing circuitry controls the switch to open and thus prevent electric power to be fed to the electric traction motor.

The processing circuitry may include a microprocessor, microcontroller, programmable digital signal processor or another programmable device. The processing circuitry may also, or instead, each include an application specific integrated circuit, a programmable gate array or programmable array logic, a programmable logic device, or a digital signal processor. Where the processing circuitry includes a programmable device such as the microprocessor, microcontroller or programmable digital signal processor mentioned above, the processor may further include computer executable code that controls operation of the programmable device. It should be understood that all or some parts of the functionality provided by means of the processing circuitry may be at least partly integrated with the electric power system.

Also, the exterior surface of the working machine should be construed as an outer surface of e.g., the frame of the working machine. The exterior surface is facing the environment at which the working machine is operated. The exterior surface is thus a surface that can potentially bump into an object. The exterior surface may also be an additional portion fixedly connected to the frame of the working machine.

The present disclosure is based on the insight that by arranging an emergency stop actuator behind a frame structure, a larger area can be covered for actuating the actuator. Thus, the frame structure can hit an object at any position along its dimension and still actuate the relatively small emergency stop actuator. An advantage is hence that the larger frame structure can act as a bumper and, when being bumped into an object, cause the electric power system to cut off the electric power to the electric traction motor to stop the working machine from further propulsion. Hereby, the safety of the working machine is improved, especially in situations where other safety mechanisms fail to function as intended.

According to an example embodiment, the frame structure may comprise a stationary portion fixedly connected to the working machine, and a movable portion movable relative to the working machine. Hereby, the frame structure is securely attached to the working machine and still able to move to actuate the actuator. Thus, according to an example embodiment, the abutment surface may be arranged on the movable portion.

According to an example embodiment, the exterior surface may be arranged on the stationary portion of the frame structure. Hereby, the exterior surface is arranged on the frame structure, whereby the movable portion is movable relative to the stationary portion. The emergency stop actuator can be arranged on the stationary portion of the frame structure. According to an example embodiment, the exterior surface may be a plate arranged in parallel with the abutment surface.

According to an example embodiment, the frame structure may further comprise a biasing member arranged between the stationary portion and the movable portion. Hereby, when the frame structure is moved from the first position towards the second position, the biasing member enables for an elastic abutment between the abutment surface and the emergency stop actuator. According to an example embodiment, the biasing member may be a helical spring.

According to an example embodiment, the frame structure may comprise a first frame portion arranged in parallel with the working machine, and a second frame portion connected to the working machine, the second frame portion being arranged perpendicular to the first frame portion. According to an example embodiment, the first frame portion may be pivotably connected to the second frame portion. Thus, the first frame portion may be movable and may comprise the abutment surface, while the second frame portion is stationary connected to the frame of the working machine.

According to an example embodiment, the first frame portion may comprise a pair of first frame portion members. According to an example embodiment, the abutment surface may be arranged on a first one of the pair of first frame portion members, and a second one of the pair of first frame portion members is pivotably connected to the second frame portion.

According to an example embodiment, the first one of the pair of first frame portion members may be arranged vertically above the second one of the pair of first frame portion members.

According to an example embodiment, the frame structure may be formed by a truss construction.

According to an example embodiment, the frame structure may be extending in parallel or perpendicular to a forward driving direction of the working machine. The frame structure can thus be connected to the frame at the vehicle's longitudinal sides, and/or at the front/rear ends of the vehicle.

According to an example embodiment, the working machine may further comprise a service brake connected to the at least one wheel, the service brake being electrically connected to the electric power system and configured to assume an engaged state in which the at least one wheel is prevented from rotating, and a disengaged state in which the at least one wheel is allowed to rotate, wherein the electric power system is configured to control the service brake to assume an engaged state upon actuation of the emergency stop actuator.

A particular advantage is that the working machine will stop substantially immediately when the emergency stop actuator is actuated. Hence, even when the electric traction motor no longer is fed by electric power from the electric power system, the vehicle will not be able to continue rolling forward/backward. The electric power system may control the service brakes to assume the engaged state by means of the processing circuitry transmitting a signal to a service brake control module or equivalent.

According to an example embodiment, the working machine may be an autonomously controlled working machine comprising an autonomously controlled propulsion and steering system electrically connected to the electric power system.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
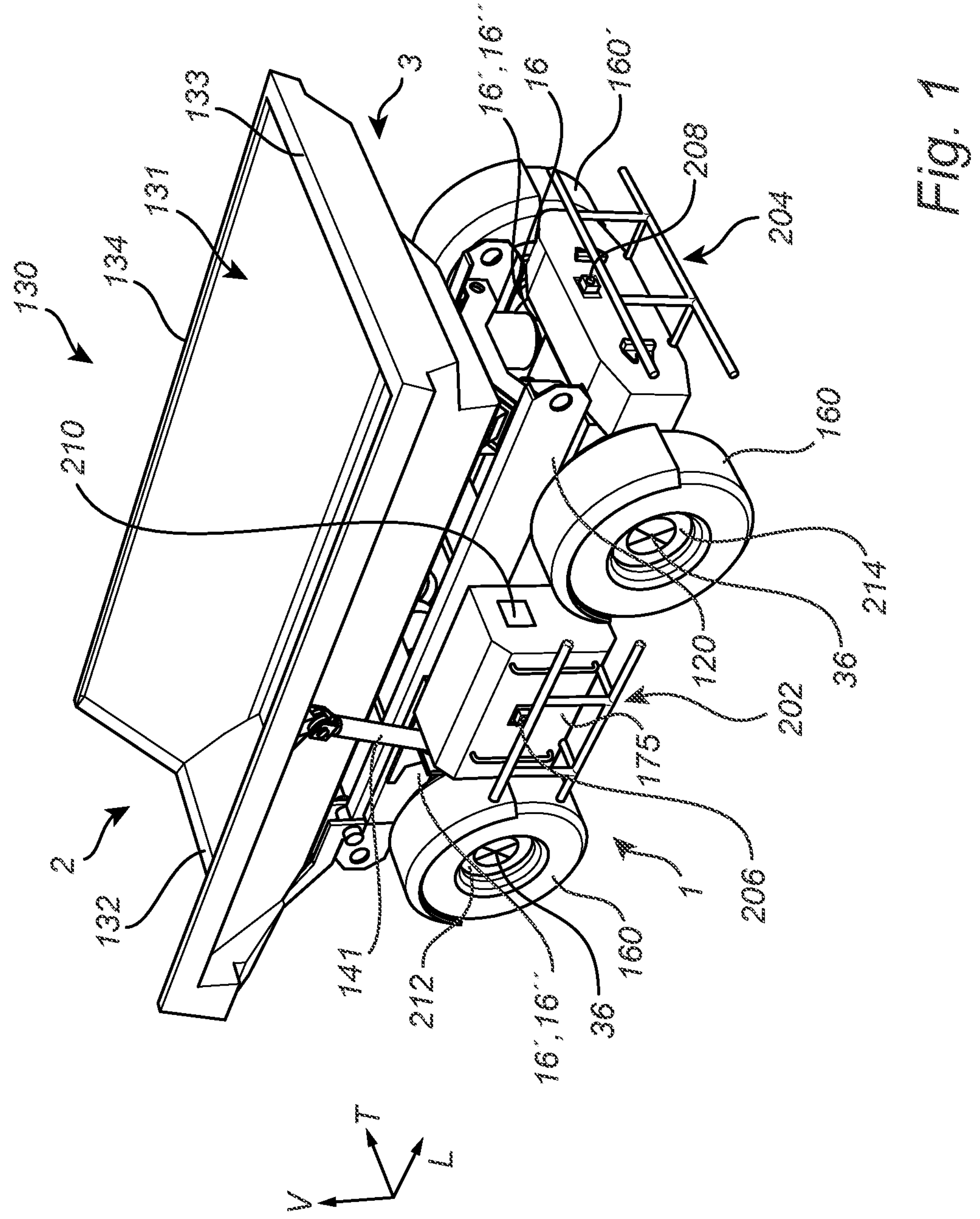
FIG. 1 is a perspective view of a working machine according to one embodiment.

The present disclosure will now be described more fully hereinafter with reference to the accompanying drawings, in which exemplary embodiments are shown. The disclosed subject matter may, however, be embodied in many different forms and should not be construed as limited to the embodiments set forth herein; rather, these embodiments are provided for thoroughness and completeness. Like reference character refer to like elements throughout the description.

With reference to FIG. 1, a working machine 1 is according to an example embodiment depicted. The inventive concept is applicable on any working machines within the fields of industrial construction machines or construction equipment, in particular dumpers/haulers. Although the present disclosure will be described with respect to a rigid hauler, the disclosed subject matter is not restricted to this particular machine, but may also be used in other working machines such as articulated haulers, excavators, backhoe loaders and wheel loaders.

As seen in FIG. 1 the working machine comprises a dump body 130 for accommodating a load. Merely as an example, and as is indicated in FIG. 1, the dump body 130 may be a loading platform of the working machine 1. The working machine 1 is adapted to have a load receiving condition in which the dump body 130 comprises an open load receiving area 131 outwardly delimited by a load receiving area circumference 134. Generally, the open load receiving area 131 may be an area that is directly accessible from the environment surrounding the working machine 1. For instance, the open load receiving area 131 may be an area that is directly accessible from the above of the dump body 130.

The working machine does not have a driver seat, but is intended to be autonomously and/or remotely driven. The working machine further comprises a first side 3 and a second side 2 arranged opposite to the first side 3, the second side 2 being a load dumping side 2. The first side 3 may also be referred to as an opposite side 3. The opposite side 3 may be used as a front-end side when the machine is driven in the direction that puts the opposite side 3 first. However, the working machine 1 may be drivable in any direction, i.e., it is bidirectional. Further, the dump body 130 comprises a load dumping end portion 132 arranged on the working machines load dumping side 2, and an opposite end portion 133 arranged on the working machines opposite side 3.

Furthermore, the working machine 1 comprises a frame structure 202, 204 connected to the working machine 1. As exemplified in FIG. 1, the working machine comprises a first frame structure 202 arranged at the longitudinal side of the working machine, and a second frame structure 204 arranged at the working machines opposite side 3. The working machine 1 may also be provided with a similar frame structure on the other longitudinal side as well as on the working machines load dumping side 2.

Further, the working machine 1 also comprises an emergency stop actuator 206, 208 arranged on the exterior surface of the working machine 1. In particular, and as will be described in further detail below with reference to FIGS. 2 and 3, the emergency stop actuator 206, 208 is arranged between the exterior surface of the working machine 1 and the frame structure 202, 204. Hence, the working machine 1 comprises a first emergency stop actuator 206 arranged between the exterior surface and the first frame structure 202, and a second emergency stop actuator 208 arranged between the exterior surface and the second frame structure 202.

Further, still referring to FIG. 1 the working machine 1 comprises a working machine frame 120 to which a pair of propulsion axles 16 is mounted. Each propulsion axle 16 comprises, amongst other things, drive shafts 16', 16". The working machine frame 120 further supports the dump body 130, and thereby carries the load of anything contained in the dump body 130 as well as the weight from the dump body itself. The propulsion axles 16 are connected to ground engaging members 160, 160' for driving the ground engaging members 160, 160'. In FIG. 1 the ground engaging members 160, 160' are illustrated as wheels, however, they may also be crawlers.

Further, a prime mover, in the following referred to as an electric traction motor 36 is installed onto the propulsion axle 16 and coupled to the drive shafts 16', 16". The electric traction motor 36 can be coupled to the drive shafts 16', 16" via a transmission arrangement, or arranged as a wheel hub motor as indicated in FIG. 1.

Still further, the working machine 1 may comprise a tilting arrangement, such as a tilting arrangement comprising one or more tilting actuators 141, such as hydraulic actuators, for tilting the dump body 130 of the working machine 1. The tilting arrangement is in one end attached to the frame 120 and in the other end to the dump body 130. In some embodiments, the tilting arrangement comprises two tilting actuators 141 arranged at different sides of the dump body to ensure a stable tilting.

FIG. 1 finally discloses an electrical control arrangement 175, arranged to the frame of the working machine 1. The electrical control arrangement 175 comprises an electric power system 210 electrically connected to the electric traction motor 36. The electric power system 210 is thus arranged to feed electric power to the electric traction motor 36 during propulsion of the working machine 1. Further, the electric power system also comprises a power source e.g., a battery arrangement, for supporting the electric motor 36 and any other components with power. Further, the electrical control arrangement 175 may comprise a control unit for controlling the working machine. The control unit may be capable of receiving a remote control signal to enable the working machine to be remotely controlled. Such a signal may be received from an external transmitting unit. It may further be capable of communicating any information to or from the working machine from or to a remote server. Such information may comprise usage data, service information, battery status, load, weight, capacity utilization or any other relevant information.

Moreover, the above-described emergency stop actuator 206, 208 is electrically connected to the electric power system 210. In particular, during actuation of the emergency stop actuator 206, 208, i.e., when the emergency stop actuator 206, 208 is pushed towards the exterior surface of the working machine 1, the electric power system 210 cuts off the electric power supply to the electric traction motor 36. Thus, when the emergency stop actuator 206, 208 is actuated, the electric traction motor 36 will not receive electric power and will thereby not be able to further propel the working machine 1.

Still further, the working machine 1 also comprises a service brake 212, 214. As exemplified in FIG. 1, the working machine 1 comprises a first service brake 212 connected to one of the wheels, and a second service brake 214 connected to another one of the wheels. According to an example, the service brake 212, 214 is electrically connected to the electric power system 210. The service brake 212, 214 is configured to assume an engaged state in which the wheel 160 is prevented from rotating, and a disengaged state in which the wheel 160 is allowed to rotate. The electric power system 210 may hereby be configured to control the service brake 212, 214 to assume an engaged state upon actuation of the emergency stop actuator 206, 208.

Figure 2:
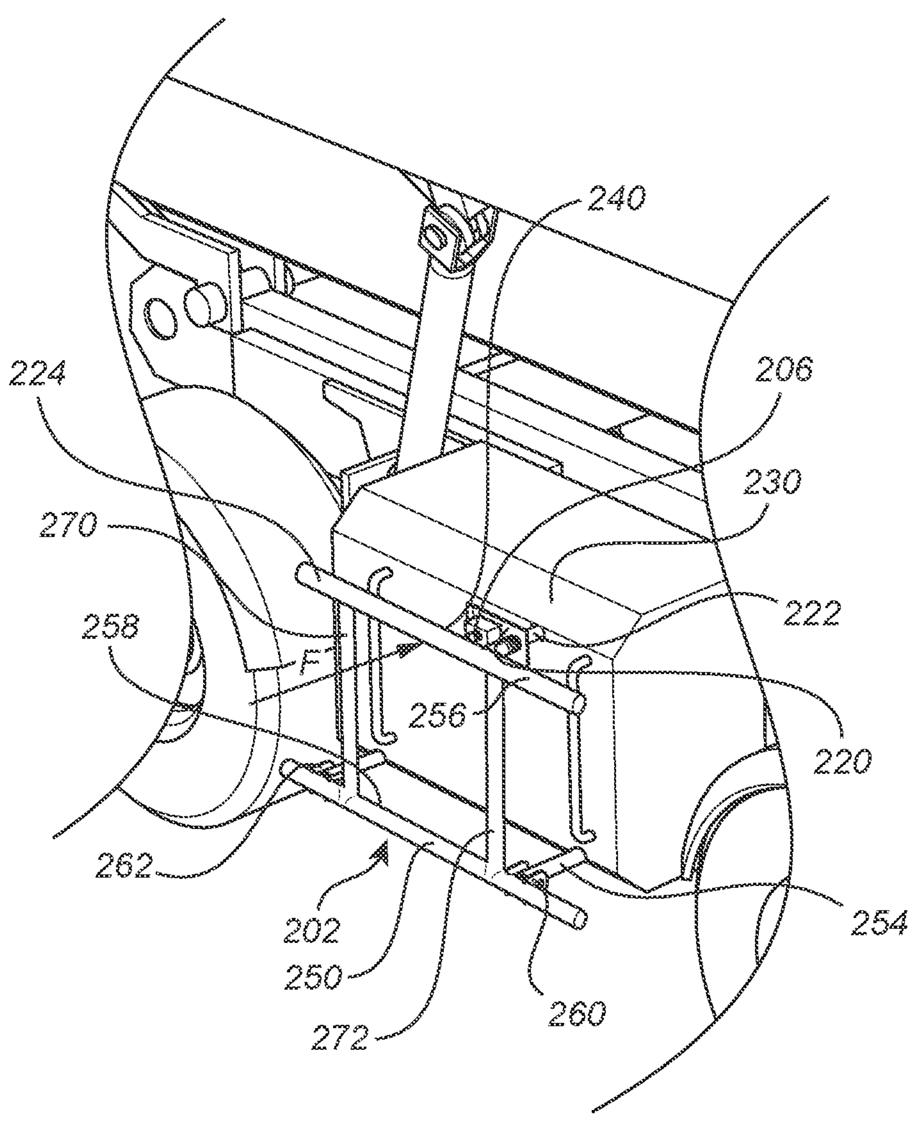
FIG. 2 is a perspective view illustrating a portion of the working machine according to an example embodiment in further detail.

In order to describe the emergency stop actuator 206, 208 and the frame portion 202, 204 in further detail, reference is now made to FIG. 2, which is a perspective view illustrating a portion of the working machine 1 according to an example embodiment in further detail. The following description is applicable to the emergency stop actuator 206 and frame portion 202 on the longitudinal side as well as the emergency stop actuator 208 and frame portion 204 on the working machines opposite side 3. However, for simplifying for the reader, reference will in the following only be made to the emergency stop actuator 206 and frame portion 202 on the longitudinal side.

As exemplified in FIG. 2, the frame structure 202 is exemplified as formed by a truss construction and comprises a stationary portion 220 fixedly connected to the working machine 1. In particular, the stationary portion 220 is connected to the working machine 1 by means of a rod 222 from the stationary portion 220 to the exterior surface 230 of the working machine. The rod 222 may form part of the exterior surface 230 of the working machine 1. Put it differently, the exterior surface 230 is arranged on the stationary portion 220 of the frame structure 202. Further, the frame structure 206 also comprises a movable portion 224. The movable portion 224 is movable relative to the working machine 1. In detail, the movable portion 224 is movable towards the exterior surface 230 as well as movable away from the exterior surface 230.

Further, the frame structure 202, and in particular the movable portion 224, comprises an abutment surface 240. The abutment surface 240 is facing the emergency stop actuator 206. When the frame structure 202 is exposed to a force F in a direction towards the exterior surface 230 of the working machine 1, the movable portion 224 moves from a first position in which the abutment surface is arranged at a distance from the emergency stop actuator 206, to a second position in which the abutment surface 224 is in abutment with the emergency stop actuator 206. The emergency stop actuator 206 is hereby actuated and the above-described electric power system cuts off the electric power supply to the electric traction motor, and optionally also controls the service brake 212, 214 to assume the engaged state.

According to the example depicted in FIG. 2, the frame structure 202 comprises a first frame portion 250 arranged in parallel, i.e., extending along the exterior surface 230 of the working machine 1. The frame structure 202 also comprises a second frame portion 254. The second frame portion 254 is connected to the working machine 1 and is arranged stationary relative to the exterior surface 230 of the working machine 1. As can be seen in FIG. 2, the frame structure 206 comprises a pivot joint 260, 262, in FIG. 2 exemplified as a first pivot joint 260 and a second pivot joint 262. The first 250 and second 254 frame portions are thus pivotably connected to each other.

Moreover, the first frame portion 250 comprises a pair of first frame portion members 256, 258. One of the first frame portion members 256 is arranged vertically above the other one of the first frame portion members 258. Put it differently, the first frame portion 250 comprises an upper first frame portion member 256 and a lower first frame portion member 258. As can be seen in FIG. 2, the abutment surface 240 is arranged on upper first frame portion member 256. The upper 256 and lower 258 frame portion members are connected to each other by means of two vertically arranged frame portion members 270, 272.

Figure 3:
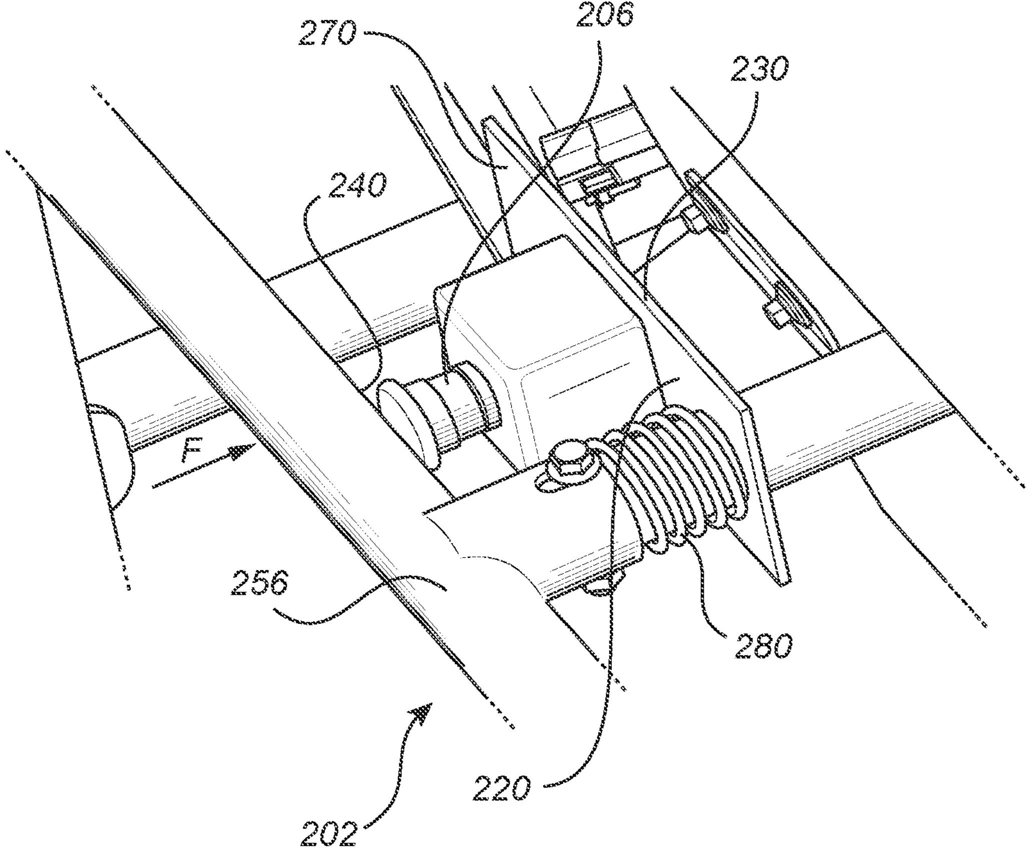
FIG. 3 is a detailed perspective view of the emergency stop actuator and the frame structure according to an example embodiment.

In order to describe an example of the frame structure 202 in yet further detail, reference is now made to FIG. 3. As can be seen in FIG. 3, the exterior surface 230 is arranged as a plate 270. The plate 270 is arranged in parallel with the abutment surface 240 of the frame structure 202. As is evident from FIG. 3, the exterior surface 230 is arranged on, or forms part of, the stationary portion 220 of the frame structure 202. The emergency stop actuator 206 is thus attached to the plate 270 and the plate is stationary relative to the working machine 1.

Moreover, the frame structure 202 comprises a biasing member 280, in FIG. 3 exemplified as a helical spring. The biasing member 280 is attached between the upper first frame portion member 256 and the plate 270. In particular, the biasing member 280 urges the upper first frame portion member 256 in a direction away from the plate 270 when no force F is applied onto the upper first frame portion member 256. In detail, the abutment surface 240 is, by means of the biasing member, urged away from the emergency stop actuator 206 when no force F is applied onto the upper first frame portion member 256.

It is to be understood that the present disclosure is not limited to the embodiments described above and illustrated in the drawings; rather, the skilled person will recognize that many changes and modifications may be made within the scope of the appended claims.

The invention claimed is:

1. A working machine, comprising:

an electric traction motor configured to apply a torque on at least one wheel of the working machine during propulsion;

an electric power system electrically connected to the electric traction motor; the electric power system being configured to, during propulsion, supply electric power to the electric traction motor;

an emergency stop actuator arranged on an exterior surface of the working machine, the emergency stop actuator being electrically connected to the electric power system, wherein the electric power system is configured to cut off the electric power supply to the electric traction motor upon actuation of the emergency stop actuator; and a frame structure connected to the working machine, the frame structure comprising an abutment surface, wherein the frame structure comprises a stationary portion fixedly connected to the working machine, and a movable portion movable relative to the working machine, the exterior surface being arranged on the stationary portion of the frame structure, wherein the exterior surface is a plate arranged in parallel with the abutment surface, wherein the frame structure is operatively arranged to move from a first position in which the abutment surface is arranged at a distance from the emergency stop actuator, to a second position in which the abutment surface is in abutment with the emergency stop actuator to thereby actuate the emergency stop actuator.

2. The working machine according to claim 1, wherein the abutment surface is arranged on the movable portion.

3. The working machine according to claim 1, wherein the frame structure further comprises a biasing member arranged between the stationary portion and the movable portion.

4. The working machine according to claim 3, wherein the biasing member is a helical spring.

5. The working machine according to claim 1, wherein the frame structure comprises a first frame portion arranged in parallel with the working machine, and a second frame portion connected to the working machine, the second frame portion being arranged perpendicular to the first frame portion.

6. The working machine according to claim 5, wherein the first frame portion is pivotably connected to the second frame portion.

7. The working machine according to claim 5, wherein the first frame portion comprises a pair of first frame portion members.

8. The working machine according to claim 7, wherein the abutment surface is arranged on a first one of the pair of first frame portion members, and a second one of the pair of first frame portion members is pivotably connected to the second frame portion.

9. The working machine according to claim 8, wherein the first one of the pair of first frame portion members is arranged vertically above the second one of the pair of first frame portion members.

10. The working machine according to claim 1, wherein the frame structure is formed by a truss construction.

11. The working machine according to claim 1, wherein the working machine further comprises a service brake connected to the at least one wheel, the service brake being electrically connected to the electric power system and configured to assume an engaged state in which the at least one wheel is prevented from rotating, and a disengaged state in which the at least one wheel is allowed to rotate, wherein the electric power system is configured to control the service brake to assume an engaged state upon actuation of the emergency stop actuator.

12. The working machine according to claim 1, wherein the working machine is an autonomously controlled working machine comprising an autonomously controlled propulsion and steering system electrically connected to the electric power system.

* * * * *